April 30, 1963 W. FLIEG 3,087,587
SPRING TYPE CLUTCH OR BRAKE
Filed Oct. 11, 1957 10 Sheets-Sheet 1

INVENTOR.
Werner Flieg
BY
S.C. Yuter
ATTORNEY

INVENTOR.
Werner Flieg

April 30, 1963  W. FLIEG  3,087,587
SPRING TYPE CLUTCH OR BRAKE
Filed Oct. 11, 1957

INVENTOR.
Werner Flieg
BY
ATTORNEY

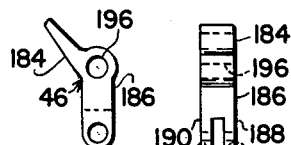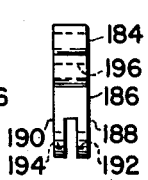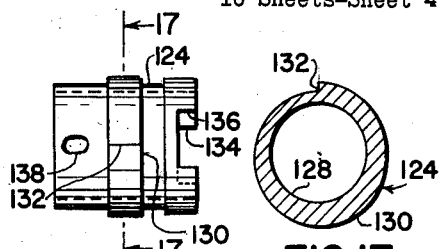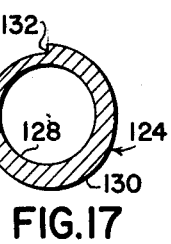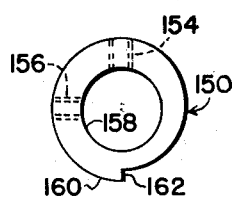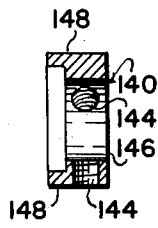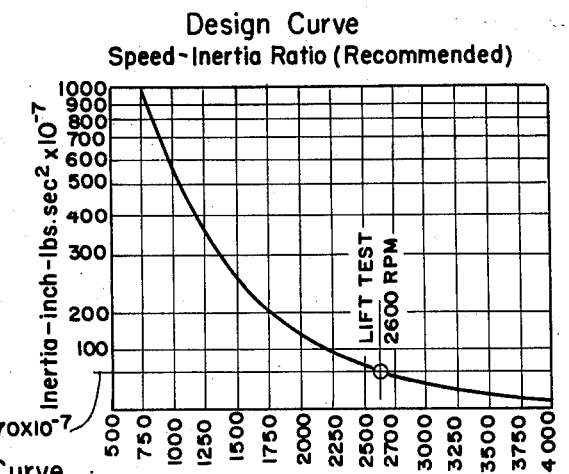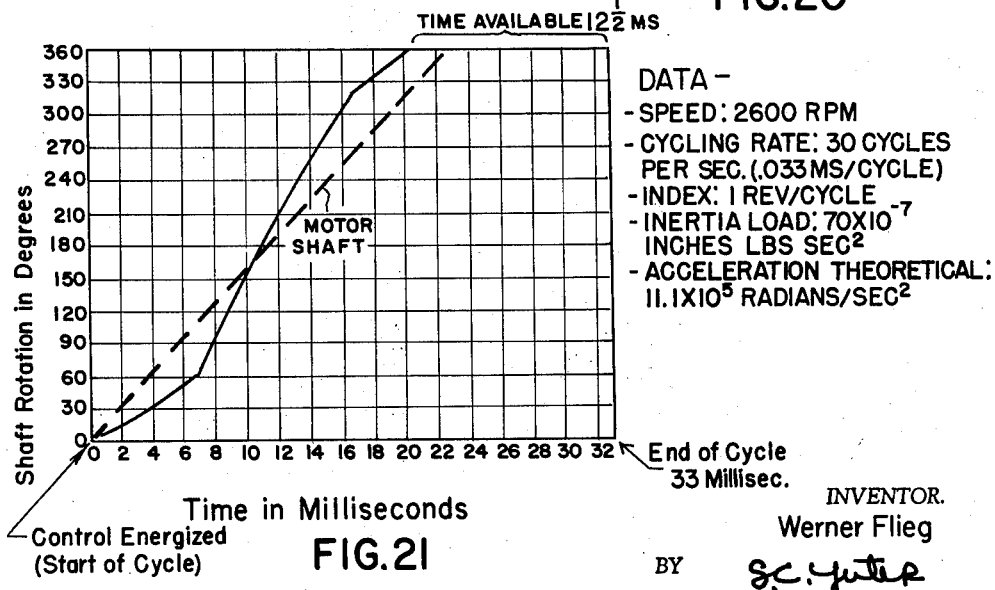

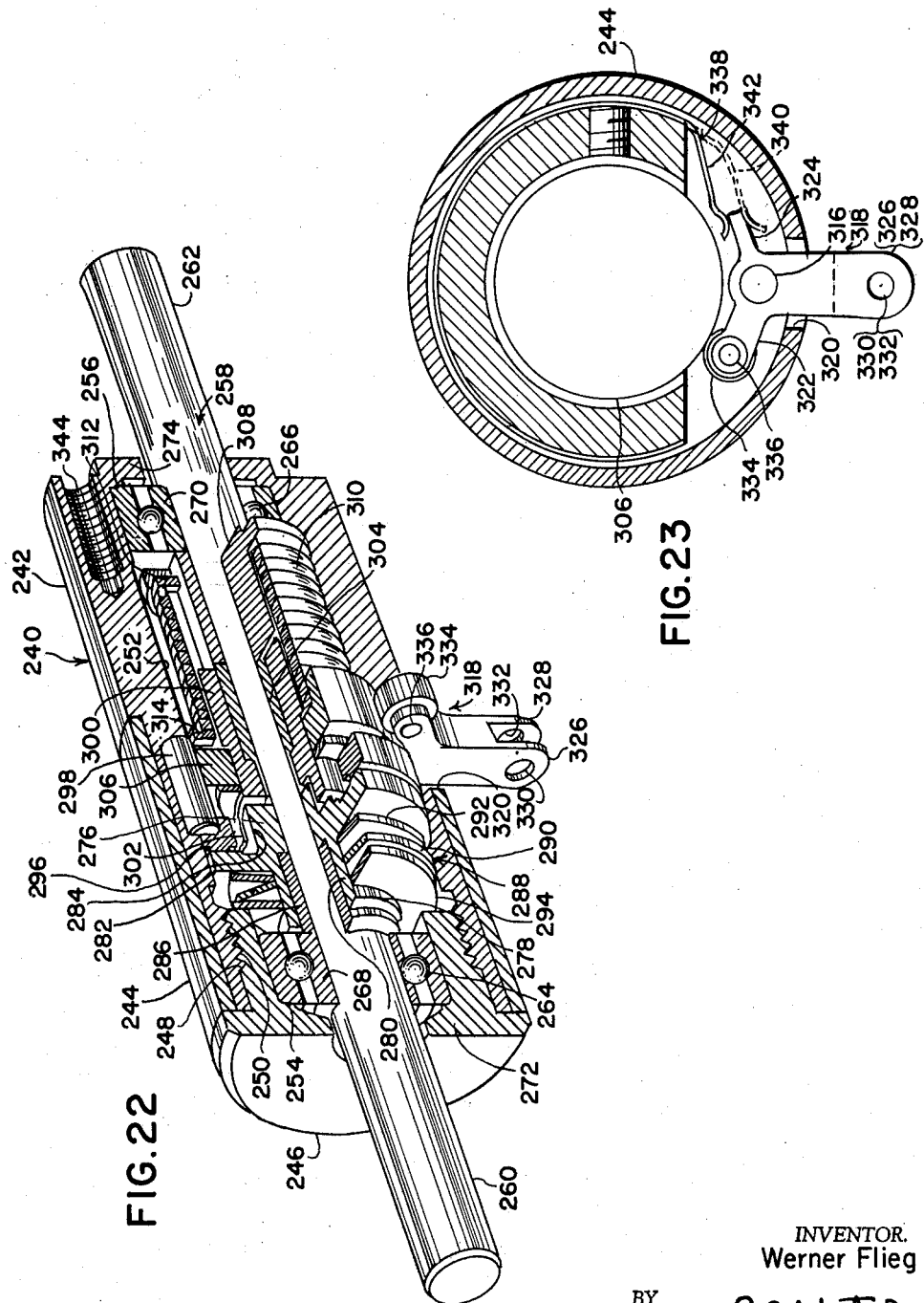

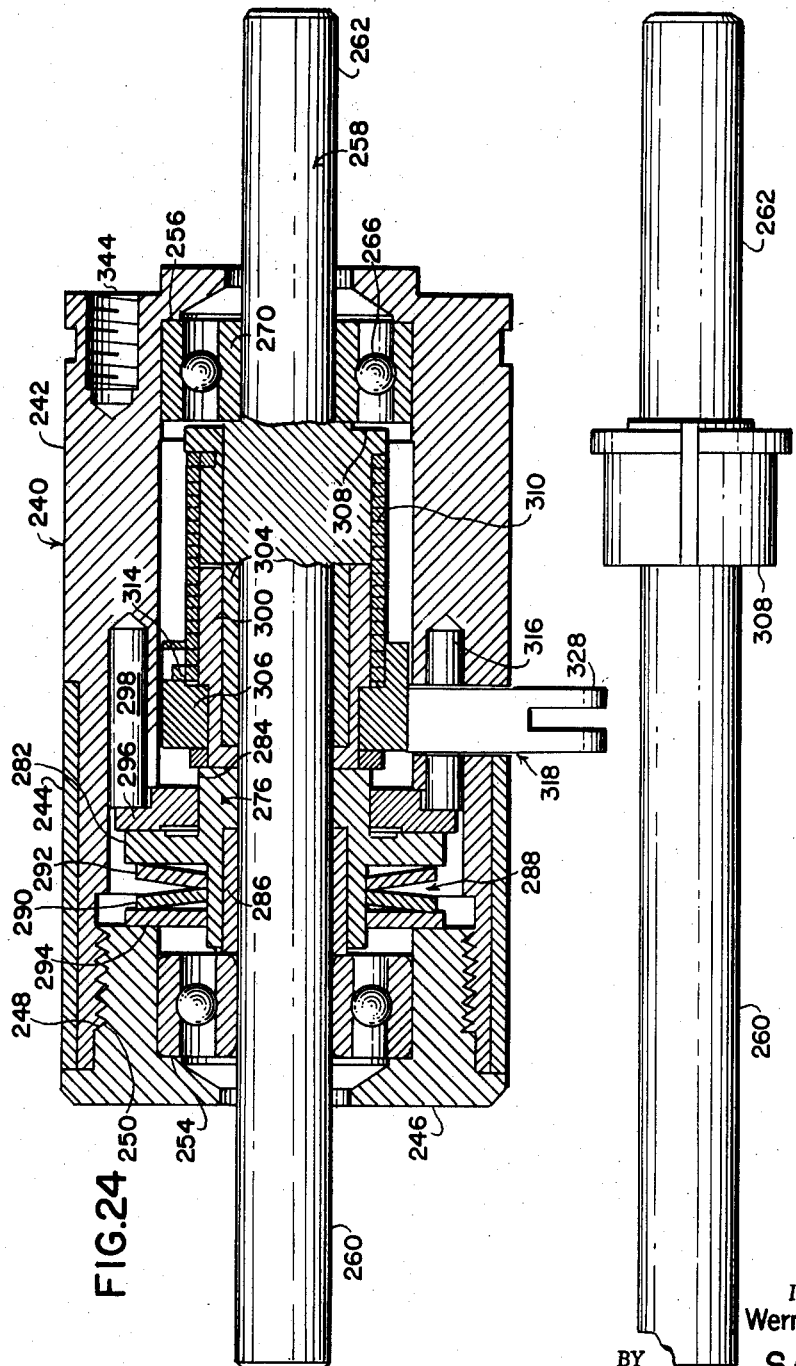

April 30, 1963 W. FLIEG 3,087,587
SPRING TYPE CLUTCH OR BRAKE
Filed Oct. 11, 1957 10 Sheets-Sheet 7

*INVENTOR.*
Werner Flieg
BY
S.C. Yutip

ATTORNEY

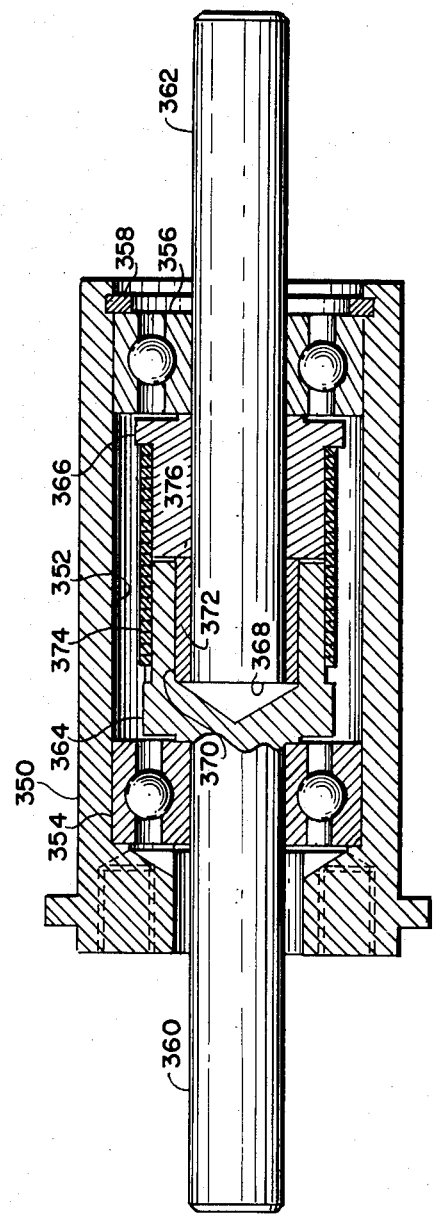

April 30, 1963    W. FLIEG    3,087,587
SPRING TYPE CLUTCH OR BRAKE
Filed Oct. 11, 1957    10 Sheets-Sheet 9

INVENTOR.
Werner Flieg
BY
S.C. Yuter
ATTORNEY

April 30, 1963 W. FLIEG 3,087,587
SPRING TYPE CLUTCH OR BRAKE
Filed Oct. 11, 1957 10 Sheets-Sheet 10
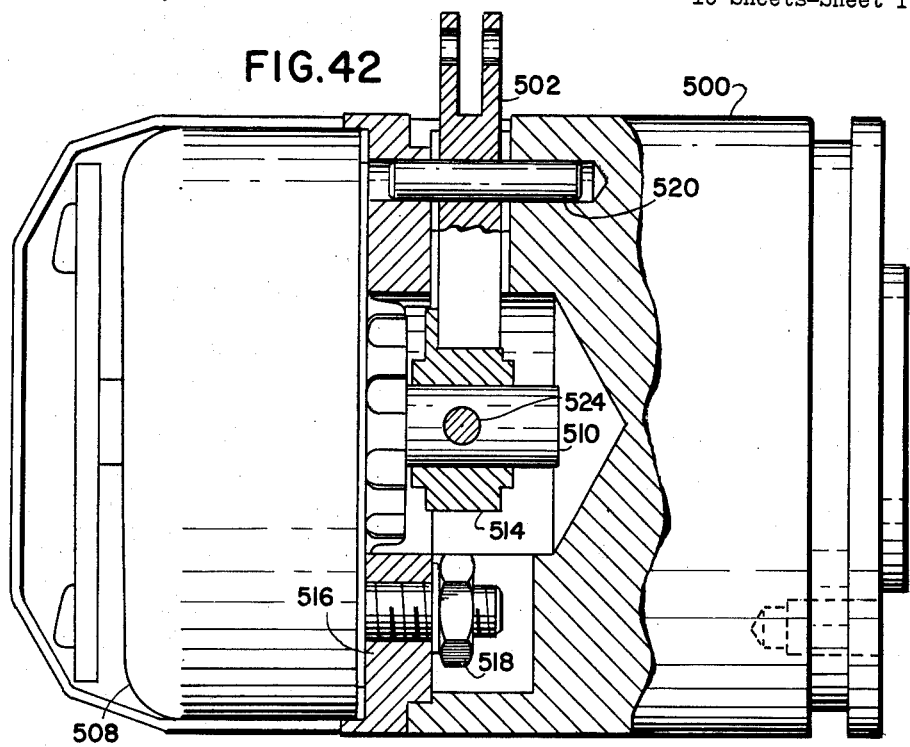
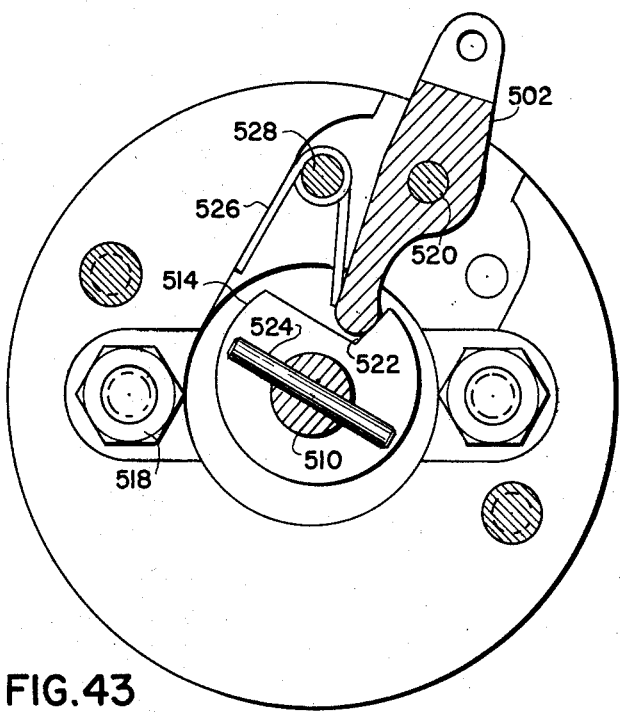
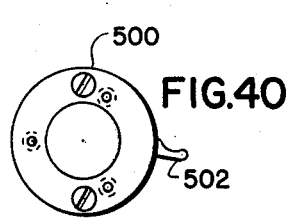
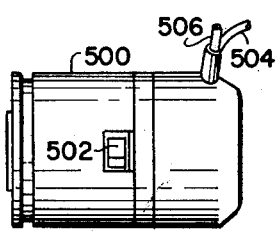
INVENTOR.
Werner Flieg
BY S.C. Yuter
ATTORNEY

3,087,587
SPRING TYPE CLUTCH OR BRAKE
Werner Flieg, Brooklyn, N.Y.
(56 Stearns St., Newton Centre, Mass.)
Filed Oct. 11, 1957, Ser. No. 689,601
8 Claims. (Cl. 192—26)

This invention relates to controllable force transmission devices, and more particularly to packaged units and sub-assemblies adapted to perform force transmission functions.

The controlled transmission of force has been employed both for controllably driving one device by another and for the conveyance of intelligence in physical form in various fields such as automation, data processing and the servo-mechanism field. A partial list of the different types of equipment associated with these fields and utilizing controlled force transmission devices includes automatic controls, computers, automatic machines, photographic devices, servo systems and measuring instruments.

The complexity of these types of equipment and the difficulties attendant their assembly is a matter of common knowledge. Thus, for example, although the various components of a system may be available individually, it is always necessary to structurally and functionally relate these components in order to derive a complete and operative system.

The structural relationship of the components of a system is important as regards the volume or space occupied by the system. Thus, in many applications relating to, for example, aeronautics and missiles, it is imperative that the occupied volume be minimized so that the ratio between transmitted power and volume is optimized and high speed operation obtained. Frequently, as will be later explained in greater detail, the efficiency of the performance of a device can be affected by its dimensions which in turn are affected by the disposition of its components.

The functional relationship of the components of a system is similarly important. Thus, components must be compatible as to load capacities, connecting mechanisms and so forth. For example, where a driving mechanism is employed to provide a driving force for a load, it must be physically capable of driving that load and, moreover, there must exist some type of device for effecting a connection, selective or otherwise, between the two components.

The number of components involved in force-utilizing systems and the complexity of the problems inherent in assembling the components to achieve their most satisfactory structural and functional relationships have amplified the difficulties which are encountered in providing a completed system. In fact, the possibilities of error or of obtaining a result which is less than optimum increase proportionally to the number of separate components involved.

Accordingly, it is the general object of the invention to alleviate some of the complexities which have previously been considered inherent in complicated systems in which the controlled transmission of forces is employed and to avoid the need for a correlating of certain of the components of such systems.

To achieve the above-noted objectives, the invention contemplates the packaging of two or more components as a single unit in which the components are adapted to cooperate in substantially universal manner to suit a wide range of physical requirements. The invention thus provides for avoiding the need for structurally and functionally relating the associated components and furthermore provides a unit which is adaptable to the different requirements of different types of equipment.

Advantageously, a packaged unit, as contemplated in accordance with the invention, can be readily adapted for use in different systems and the structural relationship between its parts can be readily ascertained. Moreover, the functional relationships can easily be accounted for inasmuch as the associated components will have been previously determined.

Significantly, a packaged unit as provided by the invention is readily mounted, easily incorporated into a system, and has an efficient ratio of occupied volume to performance as compared with previously known multiple-component arrangements. Furthermore, a packaged unit is susceptible of being described by simple specifications of its composite physical characteristics rather than by the separate specifications of the individual components. For example, the ratio of transmitted torque to energizing torque (called the amplification factor) can be readily determined which substantially simplifies system design.

It is an object of the invention, therefore, to provide an improved packaged unit in which is provided a most efficient structural and functional relationship of the associated components, the elements of the components in certain instances performing dual functions.

Furthermore, it is another object of the invention to provide packaged units which are readily assembled and disassembled and which, in this regard, are significantly more efficient than their multiple-component counterparts.

In achieving these latter objectives, the invention contemplates the provision of units comprised of sub-assemblies which facilitate assembly and whatever maintenance is required. Thus, for the transmission of torque, the invention contemplates the provision of a detachable sub-assembly capable of retaining input and output shafts in rigorous coaxial alignment, both shafts being removable or insertable together as a unit without need for adjustment or regulatory manipulation.

The controlled torque transmitter will best serve to illustrate how the volumetric efficiency provided by the invention inures to the benefit of the systems under consideration. In a torque transmitting or coupling device:

$$\text{Torque} = I\alpha$$

where $I$ is the moment of inertia and $\alpha$ is the angular acceleration in, for example, radians per second per second;

$$I = \tfrac{1}{2} M r^2$$

where $M$ is the mass or $W/g$ and $r$ is the radius of the rotated mass, $W$ being proportional to the square of the radius.

Considering the above equations, if the magnitude of the transmitted torque were the prime consideration, the radius of the mechanism through which the torque is to be transmitted should be increased and consequently a reduction in size is not of paramount importance. However, in applications with which the invention is particularly concerned, response or start time is of prime importance for accurate control and this is dependent upon minimizing inertia. Thus, for example, if the radius is doubled, $I$ increases by a factor of sixteen so that, if the transmitted torque doubles, the acceleration is only one eighth of its former magnitude. It follows that minimum dimensions are required in connection with many of the characteristics with which the invention is particularly concerned.

Aside from being concerned with optimizing characteristics of packaged units, the invention is furthermore concerned with the structural relationship of components as noted above. For example, where a control by a physical movement enters into engagement with a force transmitting component, it is usual that the engagement must be executed with accuracy.

Consequently, it is an object of the invention to provide for an optimum dimensional stability including a stable spacing of elements which are intended to engage and disengage.

Moreover, there are many systems in which some or all of the components are subjected to external forces such as high impact shocks. In this event, dimensional stability is only of importance if it continues to exist despite these external forces.

Accordingly, it is a further object of the invention to provide for dimensional stability in a manner which is unaffected by the external forces to which packaged units may be subjected.

Briefly, in accordance with one embodiment of the invention, a casing or housing is provided in which provision is made for the support of a plurality of components such as a force transmitting device and its control. The force transmitting device may be, for example, a torque clutch mechanism including input and output shafts and a device for coupling the two shafts together. The control may be, for example, a pivot control adapted for engaging the coupling device for rendering the device effective and ineffective.

In the above unit, a one-piece casing component is so arranged as to accommodate both the torque coupling mechanism and the control in such a manner that they are rigidly positioned relative to one another. Moreover, these elements are supported so as to be resistant to shock so that the unit will resist applied forces without interference with the performance of its functions. Further, pulsed control forces may be applied at extremely high rates without harmful effects from such control forces.

Further, the unit is comprised of various subassemblies such that an arrangement of the different components can be achieved with a minimum of effort and with an efficiency which has not been heretofore achieved.

Finally, the unit can be presented as a casing or housing from which extend only the input and output shafts and an associated control lever, this arrangement being suitably modified for the type of controllable force transmitting device involved.

To provide for meeting a wide range of physical requirements, the packaged unit is made substantially universal by providing for a maximum ratio of power transmission to control power requirements. This essentially makes power amplifiers of packaged units provided in accordance with the invention. Stated otherwise, small magnitudes of power are required for purposes of controlling the transmission of much larger forces through the packaged units which are provided by the invention. Similarly, small magnitudes of power are required to terminate the transmission of such forces.

A feature of the invention is the provision of a built-in but accessible control. For example, in the structure generally indicated above, a casing is provided from which extend two shafts and a control lever. This lever is readily engageable by any sort of signalling device which may be employed to manipulate the control lever. Consequently, with units provided by the invention, coupling to the control component can never constitute a problem.

A further feature of the invention is that the possibility of sealing an entire unit including a multiplicity of components is conveniently afforded. For example, in the indicated structure, the shafts can be readily sealed in at their respective bearings and the control can be easily sealed where it extends from the casing. A unit thus results which is protected from foreign matter and which can be permanently lubricated. Moreover, units of the invention can be readily designed in accordance with very rigid government specifications.

Still a further feature of the invention is the provision for minimum response times; that is, the control of the transmission of forces ensues a minimum period of time following the application of a controlling force, this being in part due to the conservation of mass and occupied volume enabled by the invention. Furthermore, this conservation contributes materially to providing shock and vibration resistant units. Moreover, the provision of a package unit enables the determination of the response time in a scientific manner and with great precision prior to installation.

Still further, the invention enables the use of integral bearings where shafts are employed due to the provision of units comprised of sub-assemblies into which bearings can be readily integrated.

Advantageosuly, the packaged units provided in accordance with the invention are compact and light in weight and can therefore be used at very high speeds. These units may moreover be characterized as low inertia and low drag components.

Additionally, an advantage of the invention resides in the fact that various different types of components can be packaged in accordance therewith. A partial listing of these components includes a mechanical amplifying clutch, an overrunning clutch, a brake which operates with a mechanical amplifying action, a clutch-brake, an indexing clutch with a mechanical pulse amplifying action, a bi-directional clutch and so forth.

These individual types of packaged units in themselves contain various features which are provided in accordance with the invention.

For example, in the indexing clutch, provision is made for a start-stop type of operation at fixed angular positions and a small energizing force is applied at a clutch control for purposes of transmitting relatively large amounts of troque. The ratio of the transmitted torque to the required energizing force is the amplification factor of the clutch.

In this indexing clutch, a helical spring is employed to bridge two drums, an input drum and an output drum; the spring is arranged to have a selective diametral interference with the drums. One end of the spring is anchored by suitable means to one of the associated shafts while the other end is fastened to an energizing sleeve which is provided with a suitable abutment. This abutment is engaged and disengaged by a suitable pivoted lever which is capable of engaging the abutment at a determinable angular position. Cooperative with the control is an "anti-reverse" detent by means of which the helical spring, during an off cycle, is held captive in a stressed condition which results in a forced diametral clearance with the input drum.

In this structure, it will be noted that a plurality of abutments might be provided so as to enable an indexing at rates of less than one rotation of the shafts. Moreover, it will be noted that the clutch and control are integrated into a single envelope. Furthermore, it will be seen that the unit can be easily provided as a normally "off" or as a normally "on" unit.

A further feature is directed to the provision of an inertia load to provide an overrunning clutch. All of the units are provided in simple envelopes as packaged units and are readily provided for flange, cleat or servo mountings. All of the units are furthermore simple and economical to manufacture.

With regard to the physical form of units which are provided in accordance with the invention, it is to be noted that, as indicated above, the units may be composed of sub-assemblies constituting packaged units. Since packaged units are provided, all adjustments are made at the time of preparing the finished units and the units can be locked or sealed by suitable means. For the rated life of each unit, no further adjustments are necessary.

It has heretofore been required that, where a number of cooperative components are to be installed, the adjustments have to be made at the time and place of installation. Consequently, this requires that a substantially large group be trained as to the details of the components which are employed. Nevertheless, efficiency of the finished system suffers in comparison to that of packaged units in accordance with the invention in which adjustments are made at a control location by a relatively small group of engineers, and technicians who are trained by repeated experiences on the same type of unit.

Heretofore, it has always been necessary to relate the force necessary to control the transmission of forces to the transmitted forces themselves at the time of installation or immediately before installation while contemplating the physical relationship between components as well as their relative characteristics. However, in packaged units provided by the invention, the amplification factor described above is predetermined and is built into the unit. Thus, the amplification factor is a known parameter of the device and therefore available to a system designer in advance. This is particularly important in high speed applications.

Significantly, the invention makes provision for the use of small control forces for the transmission of relatively large forces so that the consideration of supplying a control force is of no great consequence. Thus, in many instances, commercially available power packs or supplies can be employed although a preferred power pack, consonant with various of the objects of the invention will be described hereinafter.

In addition to the provision of a predetermined amplification factor, the invention also contemplates the provision of a predetermined response time involving the time relationship of the application of a controlling force with its actual physical effect upon the transmission of the force or forces to be controlled. The determining of response time will be later examined in greater detail, but it is to be noted that the response time is inherently determined in packaged units provided in accordance with the invention such that users of such units need not be encumbered by having to determine this characteristic or by having to employ skilled mechanics to determine and adjust this characteristic.

Other objects and features, as well as advantages, of the invention will be apparent from the following detailed description of several different types of packaged units, the description being illustrated in the accompanying drawing in which:

FIGURE 13 is a side elevation of the control lever which is utilized to engage and disengage the input and output shafts;

FIGURE 14 is a front view of the control lever shown in FIGURE 13;

FIGURE 15 is a side view of an anti-reverse lever used to lock the shaft coupling mechanism of the unit in fixed position while the mechanism is idling;

FIGURE 16 illustrates, in side elevation, the energizing ring which is employed to actuate the coupling mechanism of the unit and which is engaged by the control lever;

FIGURE 17 is a sectional view of the energizing ring of FIGURE 16 illustrating particularly the protrusion by which the ring is engaged by the control lever;

FIGURE 18 shows a side elevational view of the anti-reverse ring which is engaged by the lever of FIGURE 15;

FIGURE 19 illustrates a stop ring which limits movement of the energizing ring of FIGURE 16;

FIGURE 20 is a graph illustrating the speed-inertia characteristics of a specific packaged unit, the curve illustrating the recommended ratio;

FIGURE 21 illustrates a curve (solid line) of the angular rotation of the driven shaft compared with a curve (dotted line) of the driving shaft of the specific packaged unit;

FIGURE 22 is a perspective view of a packaged brake unit with the front half of the casing broken away to show the internal construction;

FIGURE 23 is a sectional view of the packaged brake unit of FIGURE 22 taken immediately adjacent the control lever;

FIGURE 24 is an axial section of the packaged brake unit of FIGURE 22;

FIGURE 27 illustrates a shaft employed in the packaged brake unit for the transmission of torque and upon which the braking force is exerted;

FIGURE 30 is a view of a sub-assembly of an overrunning clutch packaged unit, the housing for which is similar to the units illustrated above;

Figures 38, 39:
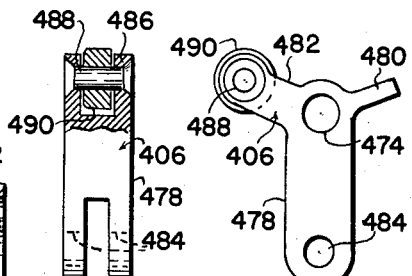
Figures 34, 37:
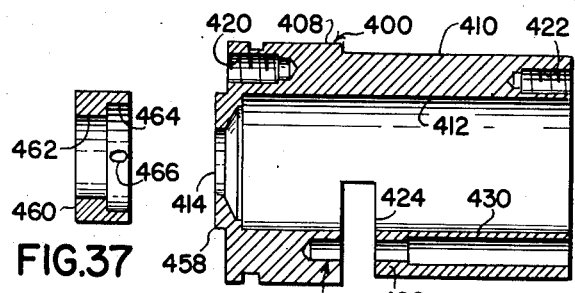
FIGURE 34 shows a housing component of the mechanical amplification clutch shown in FIGURE 31.
Figures 35, 36:
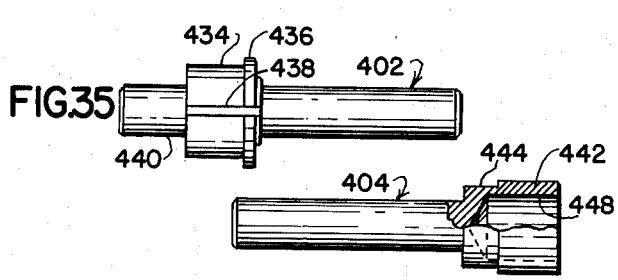
Figure 31:
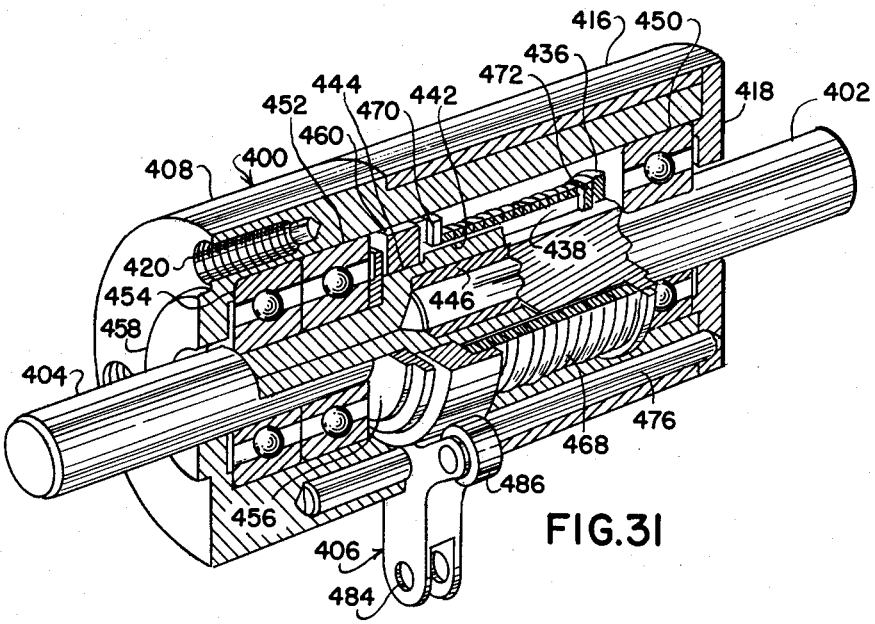
FIGURE 31 illustrates, in perspective and partially in axial section, a mechanical amplification clutch as a packaged unit in accordance with the invention.

FIGURES 35 and 36 respectively illustrate the input and output shafts of the construction shown in FIGURE 31;

FIGURES 37–39 show various components of the packaged clutch unit of FIGURE 31;

FIGURES 40 and 41 illustrate the external physical form of a preferred type of signal source or power pack to be employed with packaged units in accordance with the invention, the power pack embodying features of the invention;

FIGURE 42 is an axial section of the power pack shown in FIGURES 40 and 41; and

FIGURE 43 is an end view of a section of the power pack illustrated in FIGURE 42.

Figure 1:
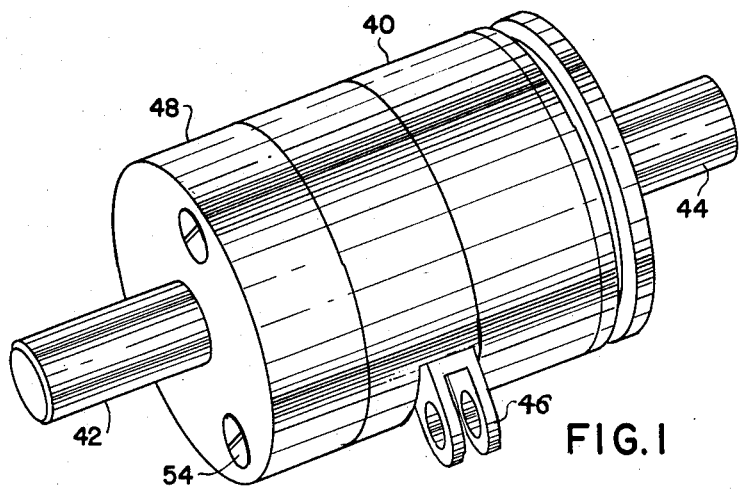
FIGURE 1 is a pictorial view of a packaged unit provided in accordance with the invention.

FIGURE 1 pictorially illustrates a typical packaged unit provided in accordance with the invention. This unit comprises a casing 40 from which extend input and output shafts 42 and 44 in axial direction and a control lever 46 in radial direction. The casing 40 includes a detachable end cap member 48 and is provided with threaded holes 50 for attachment to a support.

The simplicity of the unit as a component of a system results from the fact that included in the package are both a force transmitting mechanism and a control for this mechanism; the input and output shafts constituting elements of force transmission and the control lever constituting a mechanism for controlling the transmission. In fact, there are additional elements within the casing, but these elements need only infrequently, if ever, be the concern of a system assembler.

With a closed housing, optimum protection against foreign matter is afforded. Moreover, the closed housing facilitates permanent lubrication arrangements. Furthermore, the invention renders convenient the compact disposition of elements whereby resistance to shock and vibration is enhanced and operation at higher speeds is possible.

The invention also contemplates that the casing be employed to support not only the input and output shafts 42 and 44, but also the control lever 46 and an antireverse latch which will be later described. Since the casing can readily be made of a rigid material such as a metal (for example, aluminum), this insures a dimensional stability which inures to the benefit of the accurate engagement of parts as well as to the minimizing of wear regarding parts which are relatively movable.

Moreover, the casing can conveniently be provided for attachment to a support such as a chassis so as to facilitate greatly the composing of a system. Additionally, as will later be explained in detail, packaged units can be provided in accordance with the invention for substantially universal performance so that these units can be mass produced so as to be suitable for a large number of applications.

Figure 2:
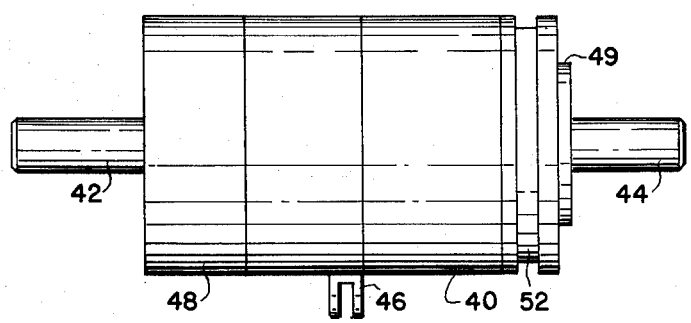
FIGURE 2 is a side elevational view of the unit illustrating the input and output shafts partially broken away with the control lever extending outwardly from the casing at the bottom.

In the side elevational view of the packaged unit shown in FIGURE 2, the shafts 42 and 44 are illustrated partially broken away to indicate that the lengths of these shafts are normally of no consequence to the design of the unit. In fact, the shafts 42 and 44 can be provided with different lengths of extension from the casing 40 so as to facilitate identification of these respective shafts; however, the casing 40 is provided with an annular groove 52 which can be employed for identification purposes, and with a pilot mounting 49 which can be used for location purposes. In FIGURE 2, the control lever 46 is shown extending downwardly out of the casing.

Figure 3:
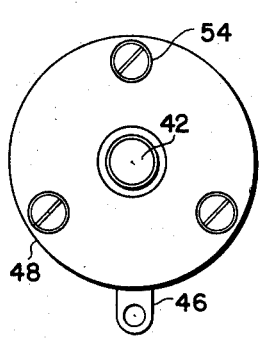
FIGURE 3 is an end view of the unit as seen from the right hand side of FIGURE 2.

The end view of the casing as illustrated in FIGURE 3 is a view of the output end of the unit and shows the output shaft 44. Also seen in this figure are the threaded holes 50 disposed at the apices of a triangle, although any other suitable arrangement can be employed. The threaded holes 50 are adapted to accommodate corresponding bolts or screws which may be passed through like holes in the chassis of the system with which the packaged unit is to be employed.

Figure 4:
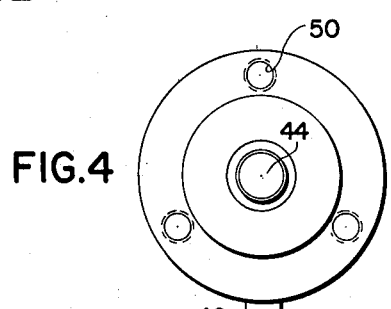
FIGURE 4 is a view of the other end of the unit.

The end view of the casing as illustrated in FIGURE 4 is a view of the input end of the unit and shows the input shaft 42. This figure further illustrates the bolts or screws 54 which are employed to fasten the cap 48 to the casing.

The casing shown in FIGURES 1-4 is cylindrical and it is considered that this is the preferred outer configuration of the unit for facilitating working and handling of the unit. Any other shape can be employed, however, for the sake of convenience or in order to meet unusual functional requirements.

Moreover, the casing can be made of metal or various synthetic materials providing that the necessary structural strength is afforded.

Figure 5:
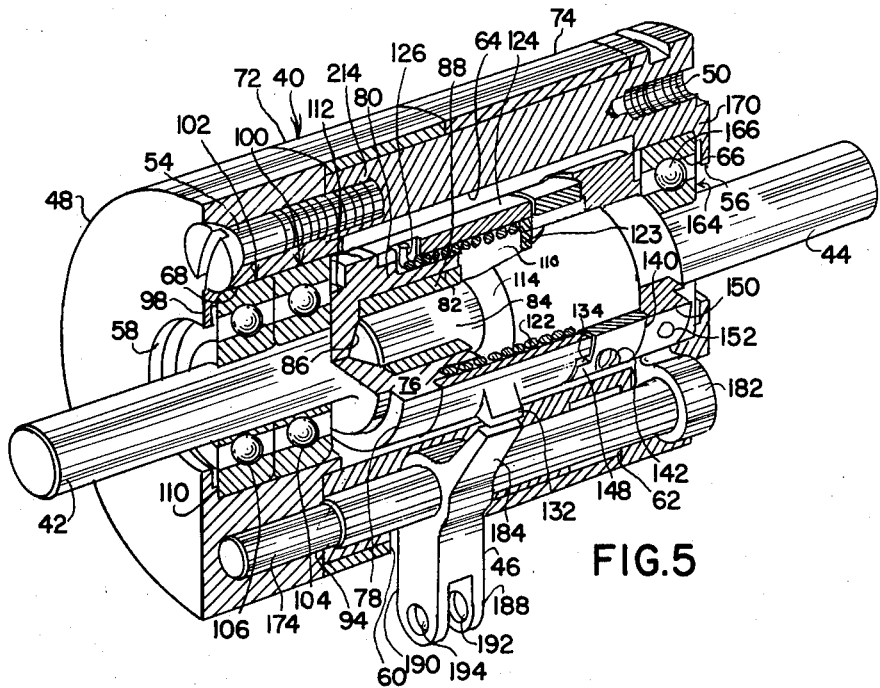
FIGURE 5 is a perspective view of the unit with the front half of the housing removed and partially broken away and partly in section in order to illustrate the internal construction of the unit.
Figure 6:
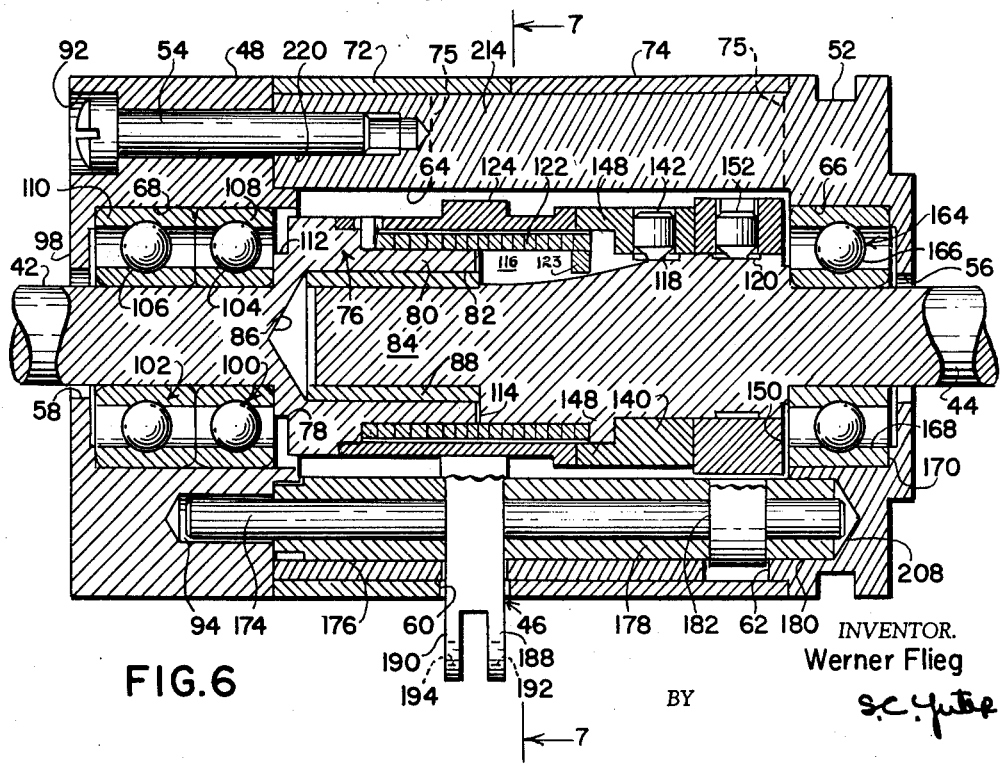
FIGURE 6 is an axial section of the unit illustrating the nesting relationship of the input and output shafts and further illustrating the mounting of the control relative to these shafts.

FIGURES 5 and 6 illustrate the internal construction of the packaged unit for the performance of the functions of an indexing clutch. It will be assumed that the specifically desired function of the clutch is to drive the output shaft by the input shaft selectively for one revolution as controlled or initiated by the control lever 46. In other words, it will be assumed that, with the input shaft continuously rotating, the output shaft, which is otherwise normally stationary, is coupled for one rotation to the input shaft. Alternatively, it might be assumed that the output shaft is normally coupled for rotation to the input shaft and that this coupling is interrupted for one rotation. Additionally, the engagement or disengagement of the output shaft for a single rotation is arbitrarily chosen and provision can be made for multiples or sub-multiples of a rotation.

FIGURES 5 and 6 can readily be identified with the packaged unit shown in FIGURES 1-4 by the inclusion of the casing or housing 40, the input and output shafts 42 and 44, the control lever 46, the end cap 48, the threaded holes 50, the annular groove 52 and the bolts 54.

FIGURES 5 and 6 furthermore illustrate that the casing 40 defines axial openings 56 and 58 through which extend the shafts 42 and 44, and the radial openings or notches 60 and 62 the purposes of which will be hereinafter described. Internally, the casing 40 defines an axial or central bore 64 having reduced diameter and portions 66 and 68. The portion 68 is, in fact, defined by the end cap 48.

Figure 7:
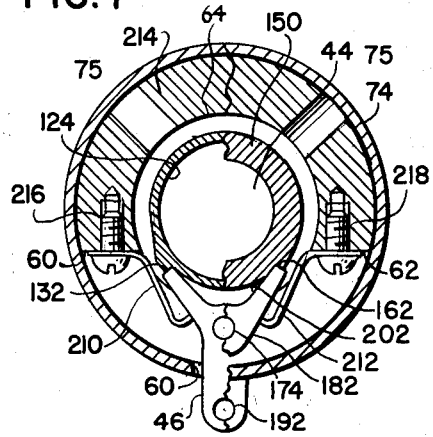
FIGURE 7 is a sectional view, partially broken away, of the unit, the section being taken along line 7—7 of FIGURE 6.
Figure 8:
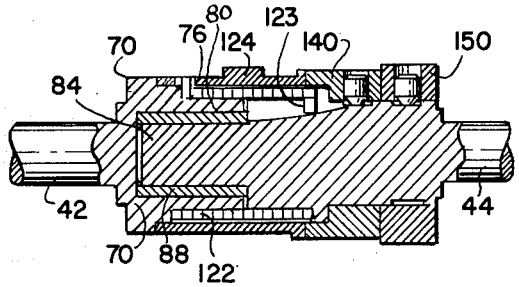
FIGURE 8 shows a sub-assembly of the unit which, in particular, includes the input and output shafts in nesting and coaxial alignment.

The circular cross-section of the housing is best seen in FIGURE 7 and the circular or cylindrical configuration of the bore 64 is suitable for accommodating the sub-assembly 70 generally indicated in FIGURE 8. As will be shown, the sub-assembly 70 is detachable as a unit from the device.

As previously noted, the housing is provided with the end cap 48 and this member facilitates the assembly and dissembly of the unit. The casing 40 is, moreover, provided with housing sleeves 72 and 74 which are detachable so as to afford convenient access to the radial openings 60 and 62 and to permit access to slots 75 (FIG. 7) for adjustment by means of set screws 142 and 152 (FIG. 6).

Referring again to FIGURES 5 and 6, it will be seen that the input shaft 42 is provided with a concentric arbor or skirted section 76 which, in turn, includes an annular rim 78 and a sheath portion 80. The skirted section 76 defines an axial bore 82 which accommodates an end 84 of the output shaft 44 and which terminates in a hollow conical section 86 to facilitate manufacture. The end 84 is positively but rotatably supported in the bore 82 by means of a bushing 88.

Figure 10:
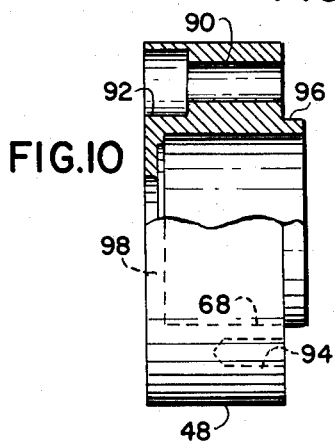
FIGURE 10 is an axial section of a cap which is adapted to close the open end of the casing portion illustrated in FIGURE 9.

The input shaft 42, as well as the sub-assembly 70 of which it is a part, is locked in the housing by means of the cap 48 which is shown in section in FIGURE 10. In the sectional view, bores 90 (one of which is shown) are indicated for the accommodation of the bolts 54, enlarged diameter sections 92 providing for the countersinking of the heads of the bolts.

The cap 48 is, moreover, provided with an axial or longitudinal bore 94, the purpose of which will hereinafter become apparent and a neck portion 96 which is adapted to be inserted into the central bore of the housing for positively relating the cap to the casing.

The cap 48 defines, as noted above, a bore 68 which is effectively terminated by a lip 98 at one end of the cap and in the bore 68, as best seen in FIGURES 5 and 6, are frictionally accommodated two ball bearings 100 and 102. The bearings 100 and 102 respectively include the balls 104 and 106 and the races 108 and 110. The bearings 100 and 102 rotatably support the input shaft 42 relative to the housing.

Figure 11:
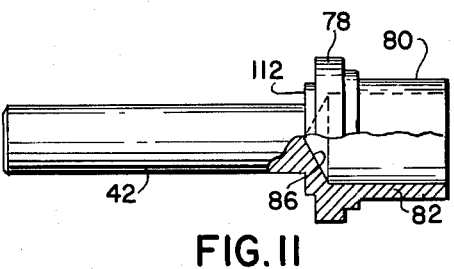
FIGURE 11 is a view, partially in section, of the input shaft.

The input shaft 42, described above, is most clearly seen as to details in FIGURE 11 in which is evident the annular rim 78, the sheath portion 80, the bore 82, and the conical portion 86 as well as a bearing face 112 which engages against the ball bearing 100.

Figure 12:
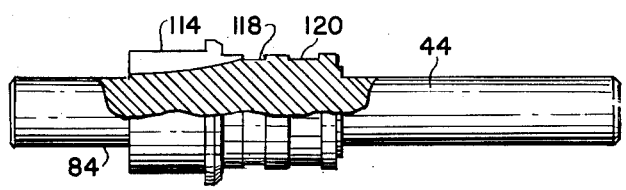
FIGURE 12 is a view, partially in section, of the output shaft.

The output shaft 44, in addition to FIGURES 5 and 6, is most clearly seen in FIGURE 12 and, in addition to the end 84, it includes a collar or arbor 114. Annular grooves 118 and 120 provide accommodation for further members as will be shown.

A flexible and resilient helical spring 122 (FIGS. 5 and 6) encircles the sheath portion 80 and the clutch drum or collar 114 (which is integral with or locked to shaft 44) and an end 123 of the spring is received in groove 116 and groove 118. The spring 122 is thus effectively locked to the output shaft via the collar 114 and is rotatable therewith. However, the inside diameter of the spring 122, when stressed, exceeds the outer diameter of the arbor 76 and particularly the sheath portion 80 so that the input shaft 42 is free to rotate without diametral interference with the spring 122 so that the shafts are normally decoupled.

In order for the input shaft 42 to be enabled to drive the output shaft 44, it is necessary that the helical spring 122 be tightened on the sheath portion 80 and for this purpose is provided an energizing ring 124 (see also FIGS. 16 and 17).

The energizing ring or sleeve 124 encircles the helical spring 122 and is coupled to an end 126 thereof. It is a rigid hollow member whose inner diameter can accommodate changes in the diameter of the spring 122. It consists of a sleeve 128 on which is mounted a spiral cam surface 130 which terminates in an abutment or ledge 132.

The energizing ring 124 further includes two open longitudinal notches 134 and 136, the purpose of which will be later explained, and a radial opening 138 which receives the end 126 of the spring 122.

Adjacent the energizing ring 124 on the output shaft 44 is a stop ring 140 (see also FIG. 19). The stop ring 140 is fastened to the output shaft 44 by means of set screws 142 accommodated in threaded holes 144. The stop ring 140 is therefore rotatable with the output shaft 44. It consists of a sleeve 146 on which are formed axial protrusions 148 which cooperatively engage with the notches 134 and 136 of the energizing ring 124.

Axially adjacent the stop ring 140 is an anti-reverse ring 150 which aids in maintaining the idling condition of the spring 122 in which the shaft 44 is not driven by the input shaft 42. The anti-reverse ring 150 (see also FIG. 18) is fastened to the output shaft 44 by means of set screws 152 accommodated in the threaded holes 154 and 156. Similarly to the energizing ring 124, it consists of a sleeve 158 having a spiral cam surface 160 terminating in a ledge or abutment 162.

Supporting the output shaft 44 relative to the casing 40 is a ball bearing 164 consisting of balls 166 and races 168. The bearing 164 is frictionally positioned in the portion 66 where it is retained by the lip 170 on the casing.

Referring next to FIGURE 8, it will be seen that various of the elements which have been described constitute the subassembly previously referred to. Briefly, this sub-assembly includes input shaft 42, output shaft 44, intermediate bushing 88, helical spring 122, energizing sleeve 124, stop ring 140 and anti-reverse ring 150. The bearings 100, 102 and 164 can either be integrated with the sub-assembly or with the casing 40 in the provided recesses.

The control for the unit is supported by the wall of the casing and comprises, in addition to the control lever 46 (see also FIGS. 13 and 14), a pivot 174 and bushings 176, 178 and 180 which can be made, for example, from nylon or neoprene. A further pivotal lever 182 (see also FIG. 15) is supported on the pivot 174 and the two levers 46 and 182 are spaced from each other and from the casing wall by the three separate bushings or sleeves 176–180.

The pivotal control lever 46 may be otherwise described as a detent latch and, as seen in FIGURES 13 and 14, it consists of two angularly disposed arms 184 and 186. The arm 184 approaches the energizing ring 124 in a tangential manner and is intended to selectively engage the abutment 132 on the energizing ring 124, and the arm 186 includes two branches 188 and 190 respectively provided with holes 192 and 194 adapted for external engagement. The lever 46 is also provided with aperture 196 by means of which the lever is mounted on the pivot 174.

The control is actuated, for example, by electromechanically generated signals transmitted as mechanical energy through a linkage system 198 from a signal device 200, both diagrammatically illustrated in FIGURE 5. The two components can be constituted, for example, by an electrical pulse generator and a solenoid in the fashion of one of the well known available power packs. The function of this latter system is to deliver in the form of mechanical pulses bursts of energy which trip the lever 46 and disengage the same from the abutment 132. A preferred signal device is hereinafter shown in greater detail.

The lever 182 as shown in FIGURE 15 consists of a lever arm 202 and an integral ring 204 which defines an aperture 206 adapted for engaging the pivot 174. The lever 182 is freely rotatable on the pivot 174 as is the lever 46.

For inserting the levers 46 and 182 into position in the casing 40, the radial openings 60 and 62 are available, and the pivot 174 is supported in the bore 94 in the end cap 48 and in a coaxially aligned bore 208 positioned in the casing.

When pivotally mounted on the pivot 174, the levers 46 and 182 are urged into a normal position of engagement with their respective abutments on the energizing ring 124 and the anti-reverse ring 150 by means of resilient cantilevers or springs 210 and 212 as best shown in FIGURE 7.

FIGURE 7, which is a composite of two sections along lines B—B and C—C of FIGURE 6, illustrates housing section 214 to which springs 210 and 212 are fastened by bolts 216 and 218. These springs are of sufficient strength to enable the accomplishment of their urging functions but yield readily to the forces exerted by the linkage system 198 and the lever 46 and by the cam surface 160 of the anti-reverse ring 150. It is to be noted that the normal direction of rotation of the shaft 44 in FIGURE 7 is counterclockwise.

Figure 9:
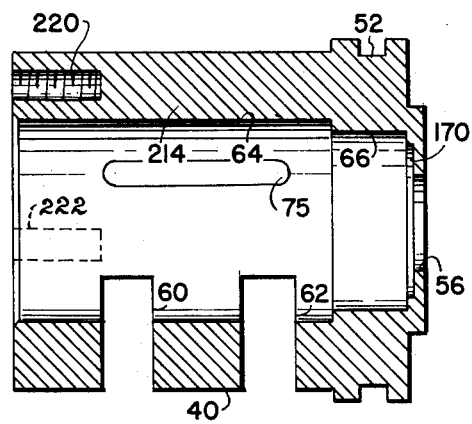
FIGURE 9 is an axial section of a portion of the casing or the housing.

FIGURE 9 further illustrates housing section 214 and, moreover, indicates the threaded bores 220 and 222 which engage the bolts 54 for the fastening of end cap 48. This figure also illustrates clearly the axial opening 56 for the output shaft as well as radial notches 60 and 62 (at which are mounted the springs 210 and 212) and the bores 64 and 66. The annular groove 52 and the lip 170 are also shown.

For composing the packaged unit, the sub-assembly may first be assembled. The end 84 of the output shaft 44 is positioned in nesting relationship in the skirted portion 76 of the input shaft 42 and particularly in the sheath 80. The bushing 88 is sandwiched between the nesting members. Next, the energizing ring 124 with the spring 122 therein and attached at end 126 is slipped over the output shaft and the end 123 of the spring is engaged with the drum 114.

With the energizing ring 124 in position, the lock ring 140 is slipped into position with the protrusions 148 engaging in the notches 134 and 136 of the energizing ring. The ring 140 is then fastened rigorously to the output shaft by means of the set screws 142. The energizing ring is thus axially restrained and its rotational movement limited to that of the output shaft 44 although the slots 134 and 136 are larger than the protrusions 148 and hence a limited free rotational movement is allowed.

Next the anti-reverse ring 150 is slipped onto the output shaft. It is set in position by the set screws 152 with the abutment 162 displaced by a predetermined angle relative to the abutment 132. This angle is an angle which would cause a slight compression or tightening of the spring 122 with the abutment 132 engaged by the lever 46 as shown, for example, in FIGURE 5, due regard being given to the length of the arm 202 of lever 182.

With the sub-assembly completed, the bearings 100 and 102 can be pressed into position in the end cap 48. Similarly, bearing 164 is pressed into position in the recess 66 of the casing 40. The sub-assembly 70 can then be initially positioned in the bore 64 and the output shaft 44 passed through the bearing 164.

Next to be positioned is the pivot 174 and the associated levers, and it is to be here noted that the pivot 174 can be provided either as a single integral shaft or in sections such as, for example, in two parts.

In either event, the lever 182 is slipped through the radial opening 62 and engaged with the pivot 174 following which the spring 212 is slipped through the opening 62 and fastened in position by means of the bolt 218.

The lever 46 is slipped through the radial opening 60 and engaged with the pivot 174 following which the spring 210 is inserted via the opening 60 to its mounting position where it is fastened by means of the bolt 216. It is to be noted that a notch in the sleeve 72 can be provided corresponding to the radial opening 60 to limit movement of the associated lever.

With all of the aforesaid members in position as indicated, the end cap 48 is placed in position at the end of the casing 40 with the lip 96 inserted into the bore 64. With the bores 90 aligned with the bores 220 of the casing 40, the bore 94 is aligned with the bore 208 and consequently the pivot 174 is supported in parallel to the input and output shafts 42 and 44 with the lever 46 extending normal thereto and out of the casing 40 via opening 60. The bolts 54 are then passed through the bores 90, threaded in the bores 220 and tightened in position and the assembling of the packaged unit is complete. A final adjustment to establish the correct relationship between abutments 132 and 162, prior to inserting sleeves 74 and 72, can then be undertaken by manipulating set screws 142 and 152. Thus, the correct relationship between the clutch and the control is achieved, this relationship remaining throughout the life of the device. Thereafter, end cap 48 is again removed, lever 46 is removed, sleeve 74 is inserted, lever 46 is replaced, sleeve 72 is inserted and end cap 48 is replaced.

Returning briefly to FIGURE 1, it is to be noted that the assembly has the appearance of a closed unit (which in fact it is) from which extend only the input and output shafts and the control lever 46. Despite its apparent simplicity, however, the packaged unit performs at least two functions. Firstly, it serves to transmit a force which is in this instance torque. Secondly, it performs a control function in that the torque is transmitted selectively as desired and in response to a control signal.

Characteristic curves for the packaged torque transmitting unit described above are shown in FIGURES 20 and 21; however, the operation of the assembled unit will next be described in order to facilitate an understanding of these curves.

Assuming the unit to have been mounted and the input shaft 42 coupled to a motor which continuously drives the shaft 42, the output shaft 44 normally remains idle since it is locked in position by the lever 182 acting on the abutment 162 of anti-reverse ring 150 and by the lever 46 acting on the abutment 132 of the energizing ring 124 and thence through the spring 122 and the collar 114 on the output shaft 44.

Moreover, the action of the lever 46 on the abutment 132 serves to unwind in part the spring 122 whose ends are fastened respectively to the energizing ring 124 and to the collar 114. With its inner diameter thus slightly increased, the spring 122 is out of diametral interference with the sheath 80 of the input shaft 42 and since there is no other coupling between the input and output shafts, the output shaft 44 remains idle.

When, however, the lever 46 is pulsed and partially pivots about the pivot 174, the abutment 132 and thereby the energizing ring 124 is released. The spring 122 tightens about the sheath 80 and frictionally engages this member. This engagement is self-perpetuating inasmuch as once engaged, the spring 122 is increasingly tightened by the drive of the shaft 42.

The shaft 44 consequently begins to rotate, but, assuming the pulsing of the lever 46 to be of sufficiently short duration, the lever 46 returns to its abutment engaging position under the influence of the spring 210.

When the shaft 44 has made one complete rotation, the abutment 132 strikes against the lever 46 which is once again in position. The lever 182 which has been moved outwardly under the influence of cam surface 160 on the anti-reverse ring 150 re-engages the abutment 162 and holds the spring 122 under slight tension so as to avoid diametral interference with the sheath 80. Actually, the output shaft 44 will rotate slightly after the lever 46 is engaged due to the inertia of the shaft and the inertia of the load, and the resiliency of the helical spring 122. It is this additional movement which enables the lever 182 to engage the abutment 162 on the antireverse ring 150 and to thus hold the spring 122 in an idling position with slight tension.

The output shaft 44 thus has rotated once and come to a position of rest at which it remains until the lever 46 is next pulsed again.

The recommended speed-inertia ratio for a packaged unit of the nature described is shown in FIGURE 20. The curve indicates the preferred outputs for a typical unit at various rotational speeds. The loads indicated are readily managed by a unit whose overall diameter is approximately eight tenths of an inch and whose overall length is less that two inches. Other and larger loads can be managed by suitable design in accordance with the invention.

The drive of the output shaft 44 relative to the movement of the input shaft 42 is shown by the comparative curves in FIGURE 21. The input shaft 42 which is driven at a constant speed is represented by a straight dotted line illustrative of the constant rate of speed. The curve representing the rotational velocity of the output shaft illustrates that the output shaft 44 first slightly lags the input shaft 42 and then, due to the resiliency of the coupling, assumes a slight lead. These curves were plotted for a speed of 2600 revolutions per minute of the input shaft 22, with a pulse rate of thirty cycles per second (.033 millisecond per cycle) and with an inertia load of $70 \times 10^{-7}$ inch-pounds-seconds$^2$. The theoretical acceleration was 11.1 radians per second$^2$.

The ideal performance of the packaged unit as noted above is supplemented by further advantages. For example, the various elements are compactly assembled and mounted so as to be shock resistant. Attention is directed, for instance, to the mounting of the lever 46 on the pivot 174 with the associated bushings 176–180. It has been determined that such an assembly can withstand severe external forces without interference with the performance of the desired functions.

The dimensional stability afforded by the invention is evidenced by the arrangement of the pivot 174 relative to the shafts 42 and 44, this relationship being determinative of the accurate and reliable engagement of the control. Thus, it will be appreciated that the use of the wall of the casing to establish important dimensions appreciably improves the accuracy of initially positioning the elements and the maintaining of this accurate positioning despite any abuse to which the unit might be subjected. Thus, the entire unit may be factory adjusted so that no maintenance is required during its useful life.

It will also be clear from the description of the unit that provision is made for avoiding the deleterious effects of foreign matter, the casing affording ample protection to the internal elements of the package. Moreover, it will be clear that permanent lubrication is greatly facilitated and that the unit is easily hermetically sealed.

Advantageously, the unit can be mounted without difficulty in any desired position without affecting the operation of its elements and without the use of separate mounting devices. Moreover, since the casing which directly supports many of the elements is the means by which the unit is mounted, vibration and shock problems are largely overcome.

Attention is also directed to the fact that the input and output shafts are coupled independently of the force which initiates their engagement. Consequently, small amounts of control force may be employed to control the transmission of much larger amounts of the force to be transmitted. This enables the packaged torque transmitting units of the invention to be regarded as mechanical amplifiers. In a typical unit, for example, it is possible to employ .05 inch-pound of control force to operate the lever 46 to control the transmission of ten inch-pounds of torque.

The rapid acceleration afforded by the invention has been illustrated in the aforenoted comparison of input and output shaft velocities and displacements. Moreover, the invention provides for maximum power to volume ratios by the compactness which it affords.

It is also to be reconsidered that packaged units of the nature described provide for built-in controls and integrated bearings. In fact, the entire package is compact and convenient and of great utility especially in connection with the preparation of complex systems.

Attention is directed to the fact that packaged units are not limited to the performance of the functions hereinbefore noted. To better illustrate this statement, a description will next be set forth in connection with a packaged unit operative as a controlled torque transmission unit provided with a brake.

The outer configuration of the brake controlled unit is the same as that shown in FIGURES 1–4, the input and output shafts, however, being part of one and the same shaft which extends through the casing and which is controlled by a control such as the control lever 46. The internal arrangement of this unit is, however, significantly different from the indexing clutch and the differences can be seen by reference to FIGURES 22–24.

Figure 26:
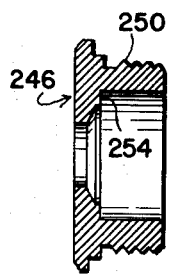
FIGURE 26 shows an end cap for the housing component of FIGURE 25.
Figure 25:
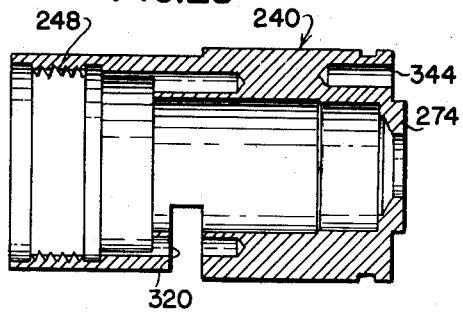
FIGURE 25 illustrates a housing component of the brake unit.

The unit shown in FIGURES 22–24 comprises a casing 240 which includes a housing unit 242, a detachable cover 244, and an end cap 246. The housing unit 242 (see also FIG. 25) includes a threaded portion 248 and the end cap 246 (see also FIG. 26) includes a threaded portion 250. The threaded portions 248 and 250 are engageable for purposes of mounting the end cap 246 on the casing.

The end cap 246 and the housing unit 242 cooperatively define a bore 252 and extending through the bore 252 and supported by bearings 254 and 256 is a one-piece rotatable shaft 258 having an input end 260 and an output end 262. The bearings 254 and 256 are ball bearings comprising respectively balls 264 and 266 and races 268 and 270. The bearings 254 and 256 are frictionally engaged in position and are retained within the bore 252 by means of the lip 272 on the end cap 246 and the lip 274 on the housing unit 242.

The shaft 258 (see also FIG. 27) is driven by a motor (not shown) coupled in known manner to the end 260 of the shaft. The end 262 of the shaft rotates directly as does the end 260.

Figures 28, 29:
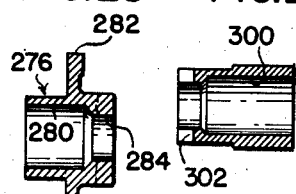
FIGURES 28 and 29 show, respectively, components of the internal construction of the brake unit.

Mounted on the shaft 258 is a disc brake 276 (see also FIG. 28) having a skirted portion 278 defining an inner bore 280, an annular rim 282, and an axial protrusion 284. The disc brake is freely rotatable relative to the shaft 258 and on a bushing 286 on the shaft 258 and in the bore 280.

A disc spring 288 consisting of several sections such as, for example, the sections 290 and 292, is sandwiched between a washer 294 and the annular rim 282. The disc spring 288 encircles the skirted portion 278 and urges the disc brake 276 toward the right in FIGURE 22.

Fixed on the housing unit 242 is a toroidal friction braking element 296. The braking element 296 is fixed against rotational movement by means of a pin 298 accommodated in a suitable recess in the housing unit 242. The pin 298 can be provided in two or more separate sections. The braking element or member 296 is the basic braking unit which operates as a reference for the braking operations.

An arbor brake 300 (see also FIG. 29) is positioned axially adjacent the disc brake 276 and is provided with an axial protrusion 302 for purposes of engaging with the protrusion 284 on the disc brake 276. A bushing 304 is sandwiched between the arbor brake 300 and the shaft 258.

Encircling a portion of the arbor brake 300 is an energizing ring 306. An arbor or collar 308 is arranged axially adjacent the arbor brake 300 and is connected to the shaft 258 to rotate therewith. Alternately, the arbor 308 can be integral with shaft 258.

A helical spring 310 encircles both the arbor brake 300 and the collar 308. An end 312 of the spring is connected to the collar 308 and the other end 314 is connected to the energizing ring 306.

With the exception of those elements constituting a portion of the casing, the elements heretofore described in regard to the brake controlled unit are the parts of a subassembly which can be removed as a unit from the casing when the end cap 246 is detached.

A pivot 316 is supported in suitable bores in the housing unit 242. Its function is to support the pivotal lever 318 which controls the shaft 258. The lever 318 is inserted into position via a radial opening 320 whereat it is ultimately positioned extending outwardly from the casing.

The lever 318 (see also FIG. 23) is a substantially Y-shaped element having upper branches 322 and 324 and two lower branches or arms 326 and 328 provided respectively with apertures 330 and 332 which accommodate a signal device (not shown). At the end of the branch 322 is mounted a roller 334 rotatable on a pivot 336. The roller 334 frictionally engages the energizing ring 306 and creates a drag thereupon under certain circumstances which will be explained.

A cantilever spring unit 338 including one of resilient members 340 (dotted line) or 342 is positioned on the casing so as to engage the branch 324 of the lever 318. The members 340 and 342 act in opposite directions on the branch 324, the member 342 tending to urge the lever 318 in clockwise direction in FIGURE 23 and the member 340 tending to urge the lever 318 in counterclockwise direction.

Member 340, if employed, normally urges the roller 334 away from the energizing ring 306 and provides a normally "off" operation. Member 342, if employed, normally urges the roller 334 against ring 306 and provides a normally "on" operation.

It is to be noted that the control has the same efficient arrangement as has been previously described and that the wall of the casing is utilized to provide dimensional stability in advantageous manner.

Moreover, the housing completely shields the internal elements of the device as well as minimizing vibration and shock problems. Additionally, the casing 240 is provided with threaded receptacles 344 to facilitate the mounting of the unit in any desired position.

In operation, assuming the casing 240 to have been mounted by means of the threaded receptacles 344 and the shaft 258 to have been connected at its input end 260 to a driving motor, the shaft 258 will be responsive to signals applied to the control lever 318.

With the casing 240 mounted, the brake member 296 is fixed both rotationally and axially. The disc spring 288, which may be a Schnorr or Belleville spring, pushes against the washer 294 and urges the disc brake 276 axially against the brake member 296. The shaft 258 rotates freely in the bore of the disc brake 276 although the latter's rotation is impeded by contact with the fixed brake element 296.

The engagement of elements 284 and 302, one on the disc brake 276 and the other on the arbor brake 300, allows a substantially unimpeded axial movement of the arbor brake 300 whereas the rotational movement of this latter element is restricted. Consequently, if the rotation of the disc brake is impeded by contact with the fixed brake member, rotation of the arbor brake 300 is likewise impeded.

The collar 208 is, as noted above, fixed to rotate with the shaft 258. The spring 310 whose end 312 is coupled to the collar 308 thus rotates with the shaft. The energizing ring 306, which is coupled to the other end 314 of the spring, is free to rotate on the arbor brake 300 and consequently rotates along with the spring 310 and the shaft 258.

Normally, the inner diameter of the spring 310 is such as to avoid diametral interference with the arbor brake 300 and, as a result, the shaft 258 rotates independently of the operation of the braking elements. Further, the control lever 318 is normally positioned so as to avoid constituting a drag on the energizing ring 306 so that the inner diameter of the spring 310 remains substantially constant.

When, however, the control lever 318 is pulsed or pivoted, the roller 334 is urged against the energizing ring 306 and creates a drag thereupon. The end 314 of the spring 310 thus lags the end 312 by reason of its attachment to the energizing ring 306 and the spring 310 commences to tighten both on the collar 308 and on the arbor brake 300.

With the spring 310 tightened on the arbor brake 300 and with the rotational movement of the arbor brake impeded as described above, the rotation of the shaft is accordingly braked. Moreover, the braking action is dependent on the engagement of the spring 310 with the arbor brake 300 which in turn is dependent on the drag which the lever 318 constitutes on the energizing ring 306. The braking action can therefore be controlled as to degree.

It is to be noted that the braking action can furthermore be adjusted by the threading of the end cap 246 into the housing unit 242 with the use of additional washers 294. Thus, if the cap 246 is threaded by its maximum amount into the housing unit 242 with additional washer 294, the contact between the disc brake 276 and the brake element 296 will be increased.

The brake-controlled, torque transmitting unit which has been noted above is thus a combination of two normally separate components, one being a torque transmitter and the other a brake control. The engaging components, namely, the energizing ring 306 and the lever 318, are spaced with a dimensional stability which is now understood as being characteristic of the invention.

Aside from the various features of the internal construction of the packaged unit, attention is directed to the fact that, as with the first described unit, a very simple package is provided, the outer configuration being shown in FIGURES 1–4. This closed unit is protected against foreign matter and is susceptible of permanent lubrication. Moreover, it is substantially shock and vibration resistant.

The unit is compact and readily mounted as well as being convenient to handle and assemble. It moreover avoids the need for functionally and structurally correlating its components when the system into which it is to be incorporated is being assembled.

A typical packaged brake has an overall diameter of .875 inch and an overall length, exclusive of shaft extensions, of about one and one-half inches. Units having these dimensions may readily be produced with braking torque ratings of from one to ten inch-pounds. For such units, approximately .06 inch-pound of energizing force is employed and the response time is about one millisecond. The power gain or amplification factor is about 160 up to speeds of 6300 revolutions per minute. Operation can be provided in normally "off" or "on" conditions. Thus, it can be seen that optimum characteristics are provided.

The internal construction of still another type of unit is illustrated in FIGURE 30, the outer configuration being substantially that shown in FIGURES 1–4. The unit of FIGURE 30 is an overrunning clutch which, as between an input and output shaft, permits driving in one rotational direction and freewheeling in the opposite direction.

The overrunning clutch includes a casing 350 defining a bore 352 in which are positioned two bearings 354 and 356. The latter bearing 356 is held in position by a retaining ring 358.

Supported by the bearings 354 and 356, respectively, are the output shaft 360 and the input shaft 362. The output shaft 360 includes an output arbor 364 integral therewith and the input shaft includes an input arbor 366 integral therewith.

The pilot end 368 of the input shaft 362 is accommodated in a bore 370 defined in the output arbor 364, the two elements being spaced by a bushing 372. The input and output shafts are thus aligned coaxially and in nesting relationship.

A helical spring 374 encircles the input and output arbors 366 and 364 respectively. The spring 374 has a normal inner diameter whereby it has a marginal or slight diametral interference with the portions which it engages. The spring 374 is furthermore coupled at one end 376 only to the input arbor 366.

According to whether the spring 374 is left-hand wound or right-hand wound, a predetermined direction of rotation of the input shaft 362 will cause the spring 374 to tighten. This will increase its engagement of the output arbor 364 and the output shaft 360 will be driven by the input shaft 362. Moreover, when rotation of the input shaft 362 is terminated, the output shaft 360 will continue to rotate under the influence of its own inertia. Consequently, the spring 374 will be unwound and will disengage from the output arbor 364 so that the output shaft 360 can continue with a freewheeling rotation. In this sense, the device constitutes an overrunning clutch or an energy sink which stores kinetic energy in potential form and releases this energy at a subsequent time.

It will be noted that rotation of the input shaft 362 in a direction which is opposite to the aforenoted predetermined direction causes the helical spring 374 to be unwound so that the input and output shafts are decoupled. In this sense, the device operates as a mechanical rectifier.

Regarding the overrunning clutch, attention is directed to the fact, as stated above, that the spring is designed to have a slight diametral interference with the members with which it is to engage. This obviates the need for an independent control in that the direction of rotation of the input shaft effects the control, this control being either the coupling or decoupling of the output shaft relative to the input shaft, an automatic release of the coupled output shaft occuring when the rotation of the input shaft is terminated.

Briefly, the overrunning clutch possesses all of the advantages which have been listed above with respect to the two previously described packaged units. It is a compact closed unit susceptible of being easily incorporated into a system and being shock and vibration resistant. Its controls are, in effect, built into the package and no functional or structural correlation of its components is required to render the unit operative. As with the previously described packaged units, the overrunning clutch is easily assembled.

A further embodiment of the invention is illustrated in FIGURES 31–39 in the form of a mechanical amplifying clutch which is provided in packaged form with a built-in control. To this embodiment inures various of the advantages which have been noted above including optimum and predetermined amplification and response time characteristics.

Figure 33:
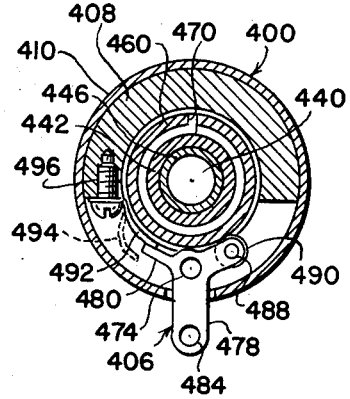
FIGURE 33 is an end sectional view of the structure of FIGURE 31.
Figure 32:
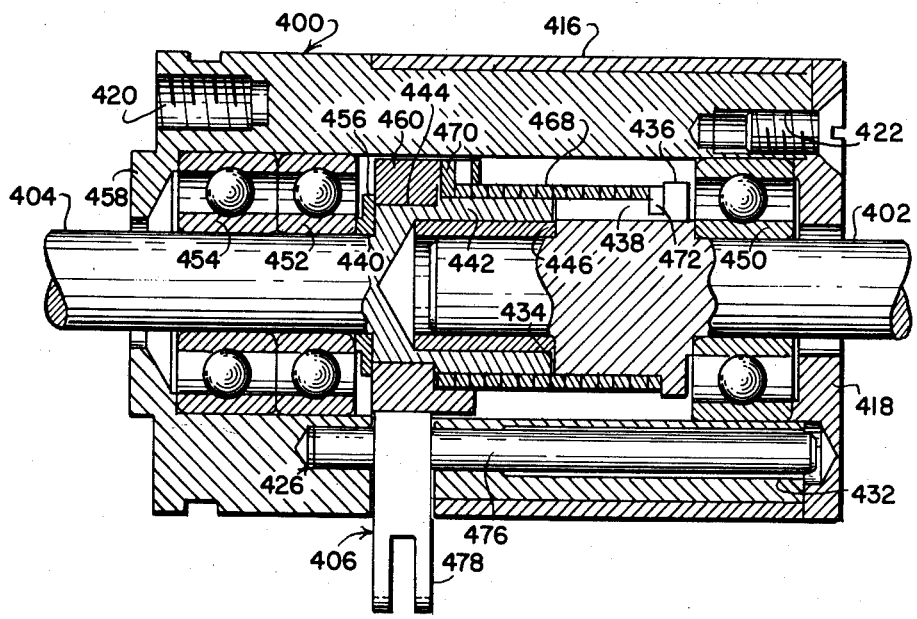
FIGURE 32 is a side sectional view of the construction shown in FIGURE 31.

In FIGURES 31–33, the amplifying clutch is seen as comprising a housing 400, an input shaft 402, an output shaft 404 and a control 406. The internal assembly of this packaged unit is arranged as a detachable sub-assembly as has been previously described.

The housing 400 (see also FIG. 34) is a substantially cylindrical member of rigid material such as aluminum or another metal and includes a casing portion 408 defining a peripheral open groove 410 and a central bore 412 open at one end but defining an axial opening 414 of lesser diameter at the other end. A housing sub-assembly shell 416 is accommodated in the groove 410 and an end plate 418 is employed to lock the internal sub-assembly in the bore 412 with the output shaft 404 extending through the axial opening 414. The housing 400 further defines threaded receptacles 420 for the mounting of the unit and threaded receptacles 422 for the attachment of the end plate 418. A radial slot 424 in the casing portion 408 accommodates the control 406 and a bore 426 parallel to the bore 412 accommodates the mounting for the control 406. The bore 426 is provided in two sections 428 and 430 having different diameters for facilitating the location of a bushing 432.

The sub-assembly which is accommodated in the bore 412 includes the input and output shafts 402 and 404. The input shaft 402 (see also FIG. 35) includes a drum 434 integral therewith and having a lip 436. The drum 434 defines a slot 438 for receiving an end of a spring as will be described. The shaft 402, moreover, includes an end 440 extending beyond the drum. The output shaft 404 (see also FIG. 36) includes a skirted portion 442 with a stepped section 444, a bushing 446 being accommodated within a bore 448 defined by the skirted section 442 and supporting the end 440 of the input shaft 402 therein. The input and output shafts are therefore in nesting relation and thus form the basis for a sub-assembly which facilitates the assembling and disassembling of the packaged unit.

The sub-assembly described above is supported, detachably, in the housing 400 by means of bearings 450, 452 and 454, the latter two bearings being mounted at the same end of the housing and cooperating with a washer 456. At the end of the housing 400 at which are located the two bearings 452 and 454 is fashioned a servo-pilot 458 which serves both for identifying the output shaft and as a location mechanism for the mounting of the unit.

Mounted on the stepped section 444 of the skirted portion 442 of the output shaft 404 is an energizing ring 460 (see also FIG. 37) having a bore 462 in which fits the section 444 and a bore 464 of larger diameter which receives the larger diameter of the skirted portion 442. Also provided is a slot 466 adapted to receive an end of a helical spring. The energizing ring 460 fits loosely on the output shaft 404.

The outer diameters of the sections 442 and 434 of the input and output shafts are substantially equal and together support a helical spring 468, and end 470 of which fits into the slot 466 of the energizing ring 460 and the other end 472 of which is received by the slot 438 on the input shaft.

Referring next to the control 406 (see also FIGS. 38 and 39), this element is provided with an aperture 474 by means of which the control is mounted on a pivot or pin 476 of one or more sections, the pin being supported by the bushing 432. The positioning of the control 406 is dependent upon the positioning of the bore 426.

Control 406 is a Y-shaped element or lever comprising limbs 478, 480 and 482. In the two limbs 478 are fashioned apertures 484 for connection to a signal source and in limbs 482 are fashioned apertures 486 for receiving the pivot 488 on which is rotatably mounted a roller 490. The limb 480 is adapted for engagement by a cantilever spring 492 or 494 (dotted line) depending upon whether normally "on" or "off" operation is desired.

Depending on which cantilever spring is employed, the spring is fastened to the casing portion 408 by a bolt 496 and the function of the spring is to urge the roller 490 normally either against or away from the energizing ring 460.

The mechanical amplifying clutch, the construction of which was described above, functions to couple, selectively, the output shaft to the input shaft and, depending upon whether the spring 492 or 494 is employed, the clutch may be either normally "on" or normally "off." For the explanation of the operation of this clutch, let it be assumed that the spring 492 is employed so that the roller 486 normally creates a drag on the energizing ring 460.

For operation, energizing ring 460 is designed so as to be able to rotate with the spring 468 and therefore with the input shaft 402. The helical spring 468 is designed so as to have normally a diametral clearance with the section 442 of the output shaft 404. The drag on the energizing ring 460 caused by the roller 490, however, causes the helical spring 468 to tighten. This causes the spring to engage both the section 442 of the output shaft 404 and the drum 434 of the input shaft 402. This engagement is self-perpetuating or self-magnifying inasmuch as, when the helical spring is caused to engage the above-noted members, it will be caused to be wound even more tightly about these members so as to engage them more tightly.

As a consequence of this engagement, the rotation of the input shaft 402 is transferred through the spring to the output shaft 404 which turns therewith and the torque of the input shaft 402 is thereby transmitted out of the packaged unit via the output shaft 404.

Assuming next that the control 406 is pulsed by the application of a signal force from some signalling device, the roller 490 is displaced from the position in which it engages with the energizing ring 460 and in which it creates a drag thereupon. The energizing ring 460 is thereby freed to return to a normal position under the influence of the unwinding of the helical spring 468 which at the same time disengages from the section 442 of the output shaft which then no longer turns with the input shaft 402.

The fixed distance between the pivot 476 of the control 406 and the periphery of the energizing ring 460 enables the characteristics of the packaged unit to be determined with ease, the user of the unit only having to be concerned with the connections to the input and output shafts and with the application of a force to the control 406. As to this latter, no problem arises since only very small forces need be employed.

The packaged units which have been described possess various advantages and achieve various objects of the invention in common. In addition, the various specific internal constructions are provided with features which inure to the benefit of each different type of unit. One of the foremost features of the invention is, however, the provision of a packaged unit complete within itself and conveniently adaptable to complex systems with which it is to be employed.

Let it be assumed, for example, that a system requires the performance of functions capable of being performed by one of the units described above, other types of packaged units being available in accordance with the invention. Let it be further assumed, for example, that a controlled index-clutching operation is required.

Normally, the control and the clutch which are separate components need first be selected for structural and functional compatibility as well as to fit into the system planned. This means that the control need be physically and dimensionally adapted or adaptable to the clutch and that these components have the capacities to operate with one another. This all requires careful planning.

In contradistinction thereto, the packaged unit provided in accordance with the invention includes a built-in control which is completely compatible with the associated clutch, and, moreover, the unit is compact and readily assembled into a system.

Furthermore, in addition to avoiding the time consuming and tedious planning noted above, a unit is provided which is inherently shock and vibration resistant. It is also self-shielding with regard to foreign matter.

Moreover, the mechanical amplification action noted above allows extreme latitude in the selection of a packaged unit. Forces can be transmitted independently of the controlling force which can therefore be minimized. Consequently, in the system, provision of the controlling force is a simple matter and this is true despite the magnitudes of the forces to be controlled.

Advantageously, dimensional stability is a feature of the invention. Whereas, in contrast to previously known procedures in which the supports for components were normally external to the components and hence had an effect upon their spacing, the invention provides for utilizing the casing of one component to support the other component in rigorous manner and hence provides for optimum engagement of the associated parts.

The invention, moreover, provides for a maximum power to volume ratio as will appear from the typical dimensions heretofore mentioned and this, in turn, facilitates incorporation into any type of system as well as, in many cases, improving the performance of the components themselves.

The packaged units provided in accordance with the inventions are themselves arranged in sub-assemblies so as to facilitate their preparation, integral bearings being included.

The packaged indexing-clutch unit provided by the invention, as well as the other units, assures rapid accelerations and therefore high fidelity responses and force transmission. Furthermore, these units are operable at comparatively high speeds.

The brake-controlled unit provides for adjustment of the braking forces employed and for control of the applied forces.

The overrunning clutch unit provides an improved control utilizing the direction of rotation of the input shaft for purposes of determining the response of the unit as a whole.

The amplifying clutch is, as are the other units, a packaged unit capable of high fidelity responses to control forces and capable of being readily incorporated into a system.

All of the described embodiments of the invention as well as those embodiments within the scope of the invention are readily employed with numerous signal sources. However, to be consonant with the general requirement of space economy, a signal source such as that shown in FIGURES 40–43 can be employed.

In FIGURES 40 and 41 is shown the physical form of a signal source or power pack which embodies certain of the features of the invention in that a simple compact package is provided which is well suited for incorporation into a system. The power pack includes a casing 500, an output lever 502 and electrical input lines 504 and 506.

Assuming a continuous but intermittent mechanical pulsing to be desired at the lever 502, a pulsed direct-current voltage is fed to the device via the lines 504 and 506.

Internally, as shown in FIGURES 42 and 43, the unit includes a rotary solenoid 508 which drives a shaft 510. A cam 514 is mounted on one end of the shaft. The solenoid 508 is mounted on a spacer 516 by means of bolts 518.

The output lever 502, which is connected to the control levers of the previously described units by a rod or the like (not shown), is supported on a pivot 520 suitably supported in the housing 500 in a manner which has been previously described in detail. The function of the lever 502 is to deliver mechanical pulses under the control of the cam 514.

The cam 514 is notched so as to present a working face 522 and, with the cam 514 rotating with the shaft due to the locking action of a pin 524, the working face 522 periodically trips the lever 502 so as to provide a mechanical pulse.

A spring 526 is employed to urge the lever 502 into a normal inoperative position as well as against the working face 522 in order to insure an accurate and controlled pulsing. The spring 526 is mounted on a pin 528 in the housing.

It will be observed that the power pack which has been described possesses various of the features and advantages of the invention. For example, the unit is a compact device in which the housing is employed for supporting a central rotating member while at the same time accurately spacing a pivotal lever therefrom. The power pack is a packaged unit which is readily incorporated into a system and which is easily protected against foreign matter. The small size possible for such a unit enables shock and vibration to be withstood and its characteristics are readily determined since its various components are fixedly spaced.

Other objects, advantages and features of the invention have been described above or will be apparent from a consideration of the detailed disclosure.

There will now be obvious to those skilled in the art many modifications and variations of the apparatus set forth which do not depart essentially from the spirit of the invention as defined in the following claims.

What is claimed is:

1. A controllable torque coupling device comprising a cylindrical housing having an axial bore, bearings at the extremes of said bore, input and output shafts supported in said bearings in coaxial alignment, a skirted portion on said input shaft, the output shaft being accommodated in said skirted portion in nesting relation, a bushing between the skirted portion and the output shaft, a collar on said output shaft and having a diameter corresponding to the diameter of the skirted portion, a helical spring encircling the skirted portion and collar and having one end coupled to the output shaft, an energizing ring encircling said helical spring and being coupled to the other end thereof, an abutment on said energizing ring, said housing defining a further bore parallel to said axial bore, a pivot in said further bore, and a lever pivotal on said pivot to engage said abutment for changing the engagement of said spring with the skirted portion and collar and thereby controlling the coupling of torque between the input and output shafts said housing comprising at least two sections, one of said sections being an end cap detachable from the housing and supporting at least one of said bearings, the inner diameter of the helical spring being less than the outer diameter of the skirted portion and collar, the engagement of said abutment by said lever loosening the spring and disengaging the shafts.

2. A device as claimed in claim 1, wherein said lever is substantially aligned relative to said energizing ring in a tangential direction for engaging said abutment and preventing rotation of said ring in one rotational direction, comprising an anti-reverse collar connected with said output shaft and including an abutment, and an anti-reverse lever on said pivot for engaging the latter said abutment to fix the position of said spring with the shafts disengaged, said levers restricting rotation in opposite directions.

3. A device as claimed in claim 1 wherein said housing comprises a detachable cap portion, said pivot being partially supported by said cap portion.

4. A device as claimed in claim 1, wherein said energizing ring defines an open axial notch, comprising a locking ring coupled to said output shaft and a protrusion on said locking ring, said energizing and locking rings being axially adjacent with said protrusion in said notch to limit rotation of said output shaft upon engagement of said energizing ring.

5. A device as claimed in claim 1 wherein said energizing ring defines a radial opening for accommodating an end of said spring.

6. A device as claimed in claim 1 wherein said skirted portion includes an annular rim for limiting axial movement of said energizing ring.

7. A device as claimed in claim 1 wherein said bushing extends out of said skirted portion to engage the collar on said output shaft for limiting axal movements thereof.

8. A device as claimed in claim 2 comprising resilient means mounted on said housing for urging said antireverse lever into a predetermined position.

References Cited in the file of this patent
UNITED STATES PATENTS

| | | |
|---|---|---|
| 468,716 | Wilson | Feb. 9, 1892 |
| 1,062,799 | Rowe | May 27, 1913 |
| 1,255,547 | Maynard | Feb. 5, 1918 |
| 1,870,646 | Pitter | Aug. 9, 1932 |
| 2,024,709 | Starkey | Dec. 17, 1935 |
| 2,134,202 | Racklyeft | Oct. 25, 1938 |
| 2,167,846 | Martin | Aug. 1, 1939 |
| 2,298,970 | Russell et al. | Oct. 13, 1942 |
| 2,299,765 | Raven | Oct. 27, 1942 |
| 2,475,432 | Marihart | July 5, 1949 |
| 2,575,012 | Harvey | Nov. 13, 1951 |
| 2,652,134 | Montooth | Sept. 15, 1953 |
| 2,670,827 | Sanders | Mar. 2, 1954 |
| 2,679,306 | Hartmann | May 25, 1954 |
| 2,716,476 | Hunter | Aug. 30, 1955 |
| 2,760,615 | Kershner | Aug. 28, 1956 |
| 2,797,785 | Earnhardt et al. | July 2, 1957 |
| 2,829,748 | Sacchini et al. | Apr. 8, 1958 |
| 2,885,042 | Frechette | May 5, 1959 |